(12) United States Patent
Nagi et al.

(10) Patent No.: US 6,869,019 B1
(45) Date of Patent: Mar. 22, 2005

(54) COMMUNICATION DEVICE (75) Inventors: Katsutoshi Nagi, Kyoto (JP); Takashi Ueda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 135 days.

(21) Appl. No.: 10/089,937

(22) PCT Filed: Sep. 8, 2000

(86) PCT No.: PCT/JP00/06178

§ 371 (c)(1),
(2), (4) Date: Apr. 5, 2002

(87) PCT Pub. No.: WO01/27869

PCT Pub. Date: Apr. 19, 2001

(30) Foreign Application Priority Data

Oct. 13, 1999 (JP) .......................... 11-290420

(51) Int. Cl.[7] .............................................. G06K 19/06
(52) U.S. Cl. ...................................... 235/492; 235/449
(58) Field of Search ................................ 235/492, 449, 235/462.47, 451, 462.45, 472.01, 382, 385, 375, 380, 441; 361/737, 818

(56) References Cited

U.S. PATENT DOCUMENTS

| | | | | |
|---|---|---|---|---|
| 5,315,096 A | * | 5/1994 | Muller et al. ........... | 235/462.13 |
| 5,438,690 A | * | 8/1995 | Tsukuda .................. | 455/300 |
| 5,477,421 A | * | 12/1995 | Bethurum ................ | 361/818 |
| 5,499,162 A | * | 3/1996 | Bartuska et al. ........... | 361/737 |
| 5,557,279 A | | 9/1996 | D'Hont | |
| 5,710,458 A | * | 1/1998 | Iwasaki ................... | 257/679 |
| 6,018,641 A | * | 1/2000 | Tsubouchi et al. ......... | 340/10.3 |
| 6,137,447 A | * | 10/2000 | Saitoh et al. ............... | 343/742 |
| 6,195,053 B1 | * | 2/2001 | Kodukula et al. ......... | 343/702 |
| 6,295,031 B1 | * | 9/2001 | Wallace et al. ............. | 343/702 |
| 6,305,607 B1 | * | 10/2001 | Katz et al. ............. | 235/462.45 |
| 6,595,419 B1 | * | 7/2003 | Doyle et al. ................. | 235/449 |
| 6,600,659 B1 | * | 7/2003 | Barnett et al. ............... | 361/761 |
| 6,607,134 B1 | * | 8/2003 | Bard et al. ............. | 235/472.01 |
| 2001/0007335 A1 | * | 7/2001 | Tuttle et al. ................. | 235/492 |
| 2002/0068589 A1 | * | 6/2002 | Gabou et al. ............... | 455/466 |
| 2004/0004113 A1 | * | 1/2004 | Blankenship ............... | 235/375 |

FOREIGN PATENT DOCUMENTS

| | | |
|---|---|---|
| GB | 2 288 103 A1 | 10/1995 |
| JP | H01-258191 | 10/1989 |
| JP | H05-184087 | 7/1993 |
| JP | H06-283918 | 10/1994 |
| JP | H07-142917 | 6/1995 |
| JP | 09181522 A1 | 7/1997 |
| JP | H11-163579 | 6/1999 |
| JP | H11-168286 | 6/1999 |
| JP | H11-238103 | 8/1999 |

OTHER PUBLICATIONS

Supplementary European Search Report dated May 9, 2003.

* cited by examiner

*Primary Examiner*—Thien M. Le
*Assistant Examiner*—Allyson N Trail
(74) *Attorney, Agent, or Firm*—Morgan, Lewis & Bockius LLP (57) ABSTRACT

In a communication device, electric circuits other than an antenna are enclosed in a shielding member made of a material that shuts off radio waves, and the antenna is enclosed by disposing in front thereof a radio wave absorbing member that attenuates radio waves in a predetermined frequency band. Thus, unnecessary electromagnetic emission is alleviated while satisfactory communication quality is secured.

15 Claims, 7 Drawing Sheets

COMMUNICATION DEVICE

TECHNICAL FIELD

The present invention relates to a communication device that supplies electric power to a communication partner and communicates therewith by electromagnetic induction on a non-contact basis.

BACKGROUND ART

A non-contact communication system consists of an interrogator installed in a fixed position and a responder formed in the shape of a card so as to be portable. The supply of electric power from the interrogator to the responder and the communication between the interrogator and the responder are achieved by electromagnetic induction on a non-contact basis. Thus, non-contact communication systems, having the advantages that the responder does not need to incorporate a battery and that the interrogator and the responder communicate with each other on a non-contact basis, are adopted in a variety of fields, for example in lift facilities in skiing grounds, for ticket examination in railway systems, and for baggage sorting.

Now, an interrogator 1 and a responder 2 constituting a non-contact communication system will be described with reference to FIG. 7. The interrogator 1 operates as follows. A modulator circuit 12 modulates a carrier, which is a radio-frequency signal output from a carrier supply circuit 11, with an interrogation signal Q, which is fed from a controller 16, and outputs a modulated signal. The signal output from the modulator circuit 12 is subjected to power amplification by a power amplifier circuit 13, and is then transmitted from an antenna 14 composed of a coil 141 and a capacitor 142.

The controller 16 is so configured as to keep feeding the interrogation signal Q to the modulator circuit 12 for a predetermined period, then cease feeding it thereto for a predetermined period, and then repeat these two modes of operation alternately. Thus, as shown in FIG. 8(a), the signal transmitted from the interrogator 1 is a radio-frequency signal that is modulated with the interrogation signal Q in periods T1 and that is unmodulated in periods T2, with the periods T1 and T2 repeating alternately.

The responder 2 operates as follows. Through electromagnetic induction, the signal transmitted from the interrogator 1 is received by an antenna 21 composed of a coil 211 and a capacitor 212. The signal received by the antenna 21 is rectified by a rectifier circuit 22, and a regulator 25 produces, from the resulting direct-current electric power, stabilized direct-current electric power. A demodulator circuit 26 and a signal processor circuit 27 operate from the electric power produced by the regulator 25.

The demodulator circuit 26 demodulates the interrogation signal Q from the signal obtained from the rectifier circuit 22 in the periods T1. The signal processor circuit 27 outputs, in the periods T2, a response signal A corresponding to the interrogation signal Q demodulated by the demodulator circuit 26. This response signal A consists of a train of pulses, and controls the on/off states of a switch circuit 24. The switch circuit 24 is connected in series with a resistor 23, and these are connected across the output of the rectifier circuit 22. Thus, as the switch circuit 24 is turned on and off, the impedance of the load circuit that is connected to the output of the power amplifier circuit 13 of the interrogator 1 and that thus includes the responder 2 varies. The resistor 23 and the switch circuit 24 may be connected across the input of the rectifier circuit 22.

Figure 7:
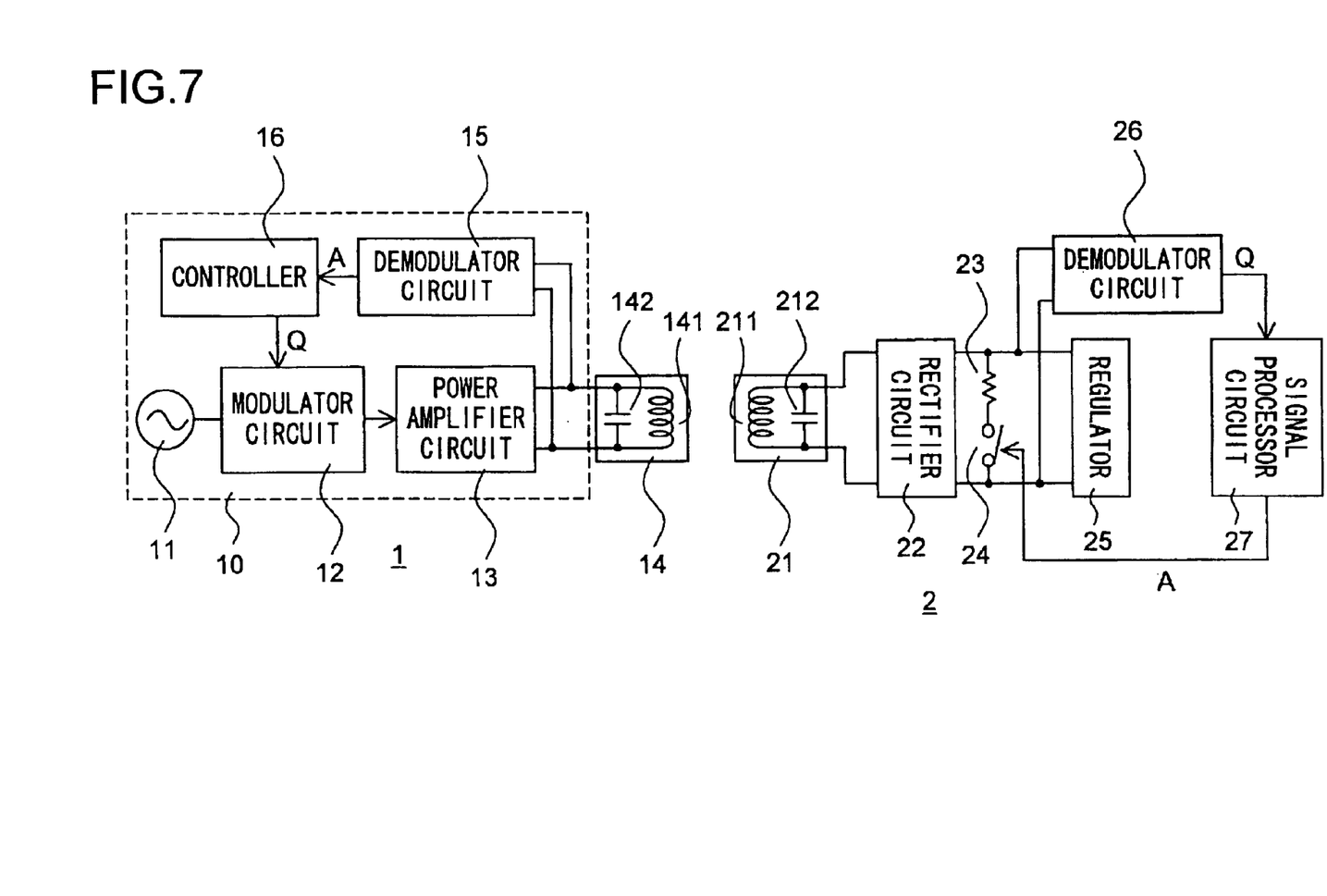
FIG. 7 is a block diagram showing a system consisting of an interrogator and a responder.
Figure 8:
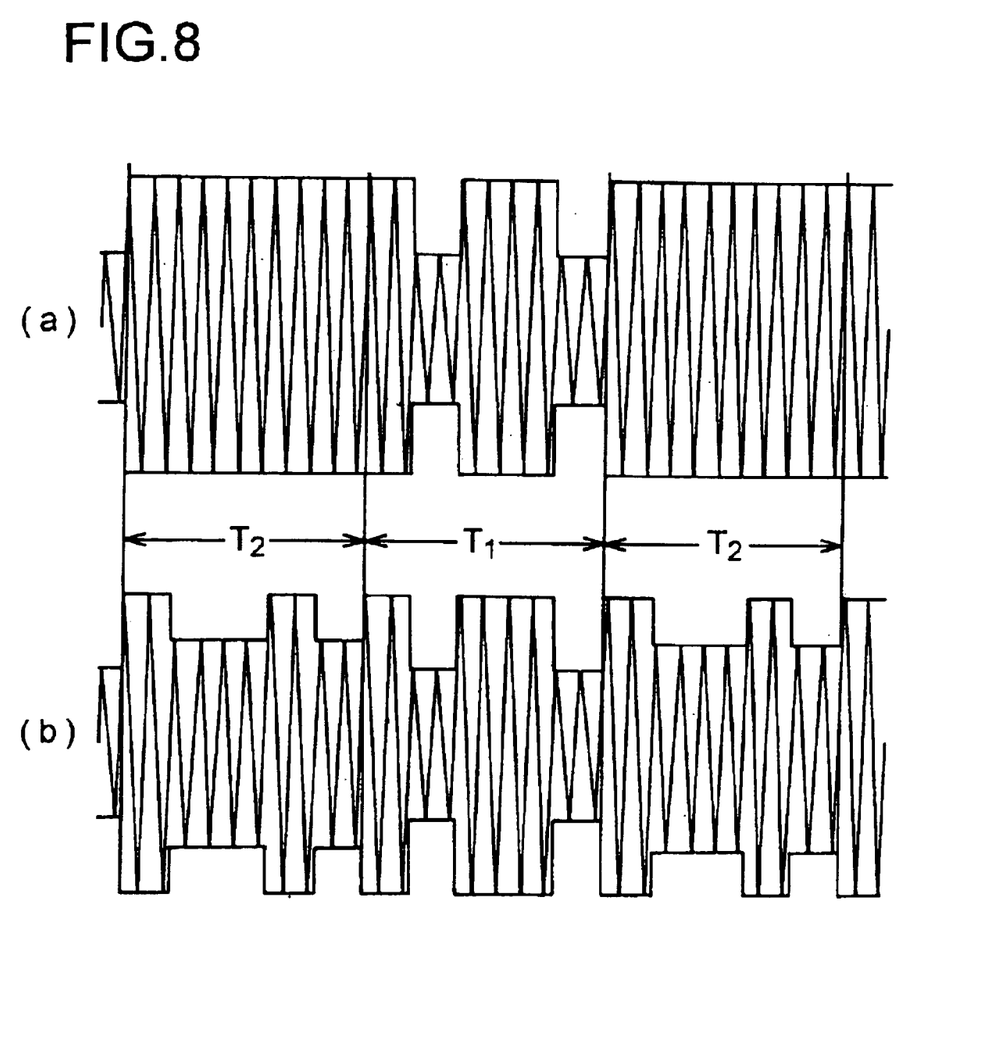
FIG. 8 is a diagram showing the waveforms of the signals communicated between the interrogator and the responder.

Accordingly, in the periods T2, the signal output from the power amplifier circuit 13, which is originally an unmodulated carrier, is amplitude-modulated by the response signal A as shown in FIG. 8(b) as a result of the variation in the impedance of the load circuit of the power amplifier circuit 13. This modulated signal is demodulated by a demodulator circuit 15 of the interrogator 1, and thus the response signal A is obtained. According to the response signal A obtained from the demodulator circuit 15, the controller 16 operates in a predetermined manner.

In general, unnecessary electromagnetic emission from electric equipment is alleviated by matching circuits, or by providing a shield made of metal or the like. However, in the non-contact communication system described above, the interrogator and the responder form a complete circuit with space interposed in between, and therefore it is difficult to achieve circuit matching. On the other hand, by shielding the whole interrogator, as by forming the housing thereof out of metal or the like, it is possible to alleviate unnecessary electromagnetic emission, but this makes communication impossible. For these reasons, it is customary, as a measure to alleviate unnecessary electromagnetic emission from the interrogator 1, to enclose only the internal circuits 10 thereof, i.e. the electric circuits other than the antenna 14, in metal or the like.

However, in the conventional interrogator, almost no measures are taken against unnecessary electromagnetic emission from its antenna itself, and thus unnecessary electromagnetic emission from the interrogator as a whole is not satisfactorily alleviated.

DISCLOSURE OF THE INVENTION

According to the present invention, in a communication device that supplies electric power to a communication partner and communicates therewith by electromagnetic induction on a non-contact basis, electric circuits other than an antenna are enclosed in a first shielding member made of a material that shuts off, reflects, or absorbs radio waves, and the antenna is enclosed in a second shielding member of which the portion facing the front face of the antenna is made of a material that attenuates radio waves in a predetermined frequency band.

Alternatively, according to the present invention, in a communication device that supplies electric power to a communication partner and communicates therewith by electromagnetic induction on a non-contact basis, an antenna and electric circuits other than the antenna are separately enclosed in shielding members made of a material that shuts off, reflects, or absorbs radio waves, and the shielding members have an opening formed in the portion thereof facing the front face of the antenna.

BEST MODE FOR CARRYING OUT THE INVENTION

Figure 1A:
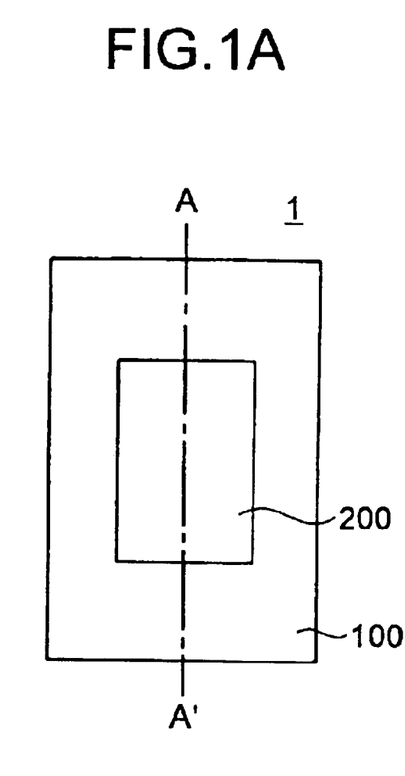
FIGS. 1A and 1B are an external front view and a sectional view, respectively, of the interrogator of a first embodiment of the invention.
Figure 1B:
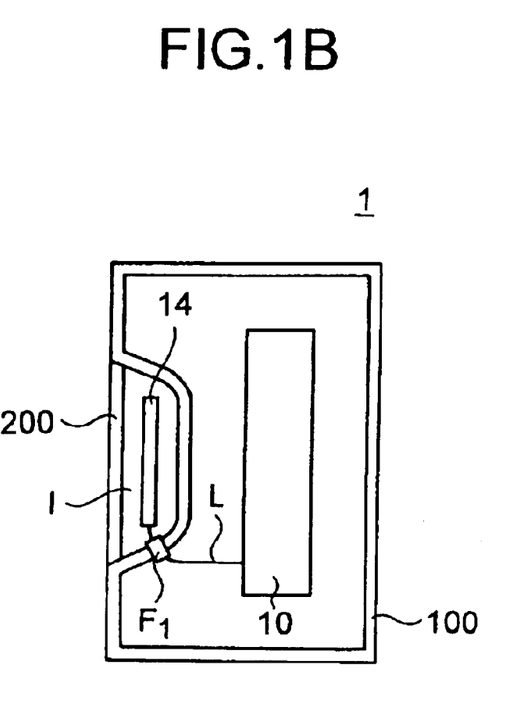

Hereinafter, embodiments of the present invention will be described with reference to the drawings. The interrogator 1 of a first embodiment of the invention has the same configuration as that shown in FIG. 7. FIG. 1A is an external front view of this interrogator 1, and FIG. 1B is a sectional view thereof taken along line A–A' shown in FIG. 1A. The internal circuits 10 other than the antenna 14 are enclosed in a shielding member 100 made of a material that shuts off, reflects, or absorbs (in other words, attenuates) radio waves. The shielding member is made of, for example, metal.

The shielding member 100 enclosing the internal circuits 10 has a recess I formed therein so as to sink inward. The antenna 14 is arranged in this recess I. In front of the antenna 14, a shielding member 200 made of a material that attenuates radio waves in a predetermined frequency band is arranged so as to cover the opening of the recess I. Thus, the antenna 14 is enclosed, at the front face thereof, by the shielding member 200 and, at the other faces than the front face thereof, by the shielding member 100, which encloses the internal circuits 10 as well.

Figure 2:
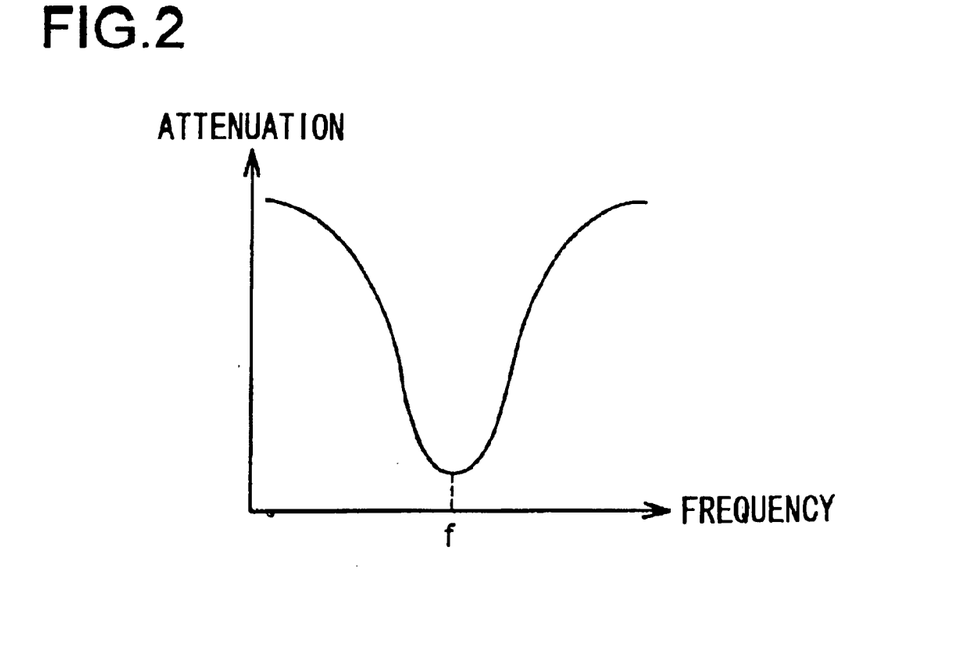
FIG. 2 is a diagram showing an example of the frequency response of the shielding member used in the interrogator of the first embodiment of the invention.

In this structure, by forming the shielding member 200 out of a material that has such a frequency response as to permit passage of radio waves only in a frequency band centered around the frequency "f" used for communication as shown in FIG. 2, it is possible to alleviate unnecessary electromagnetic emission from the antenna 14 to outside the interrogator while securing satisfactory communication quality.

Figure 3:
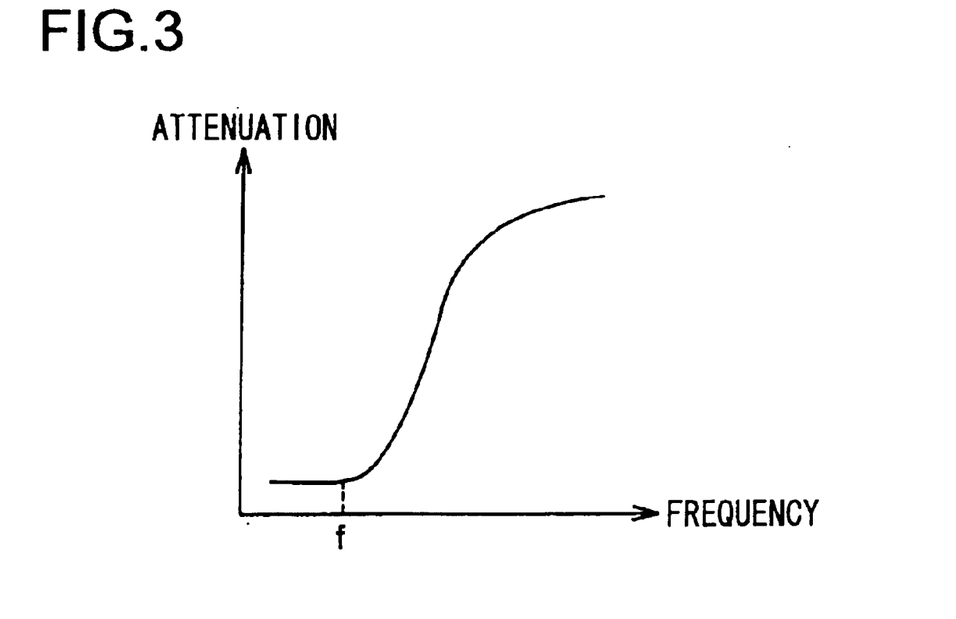
FIG. 3 is a diagram showing another example of the frequency response of the shielding member used in the interrogator of the first embodiment of the invention.

In a case where the level of unnecessary electromagnetic emission is low in a frequency band lower than the frequency "f" used for communication, the shielding member 200 may be formed out of a material that has such a frequency response as to attenuate radio waves in a frequency band higher than the frequency "f" used for communication as shown in FIG. 3.

Moreover, as shown in FIG. 1B, by inserting a filter $F_1$ having a frequency response identical with that of the shielding member 200 in the line L that electrically connects the antenna 14 to the internal circuits 10, it is possible to further alleviate unnecessary electromagnetic emission.

Figure 4A:
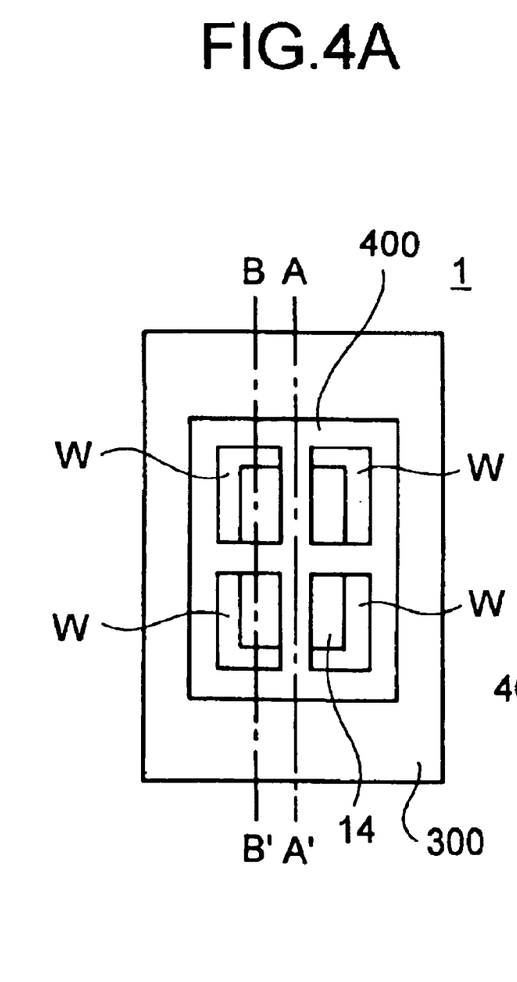
FIGS. 4A, 4B, and 4C are an external front view and sectional views, respectively, of the interrogator of a second embodiment of the invention.
Figure 4B:
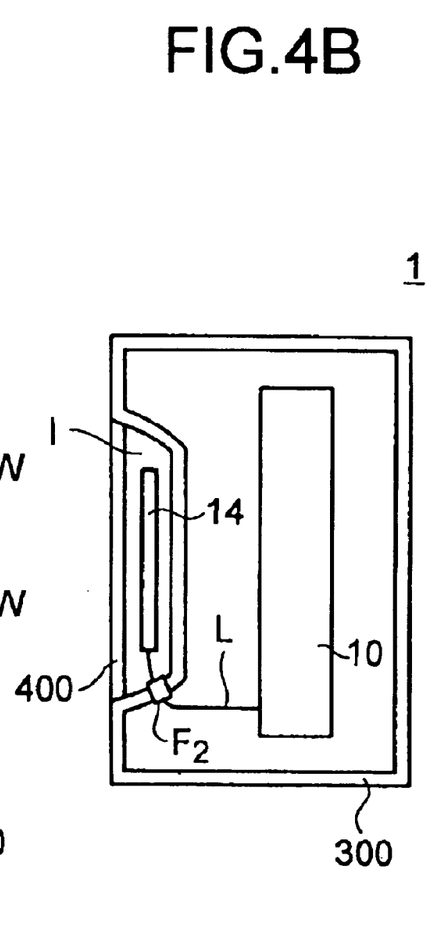
Figure 4C:
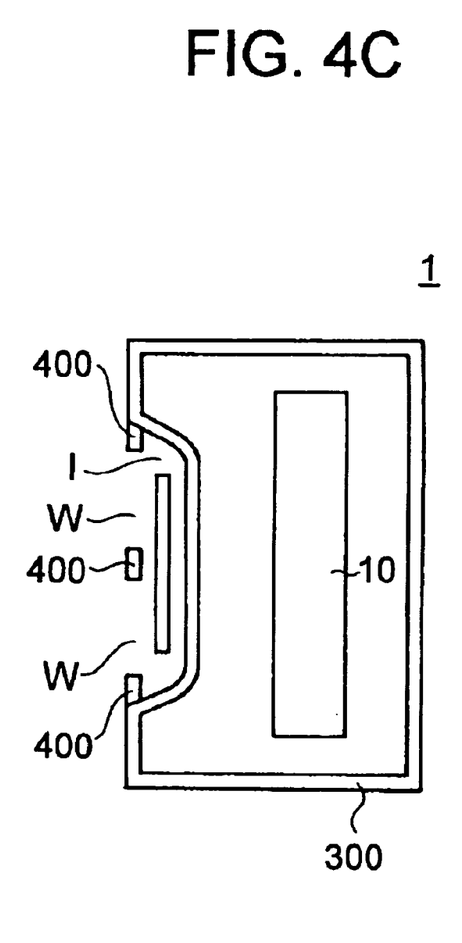

The interrogator 1 of a second embodiment of the invention has the same configuration as that shown in FIG. 7. FIG. 4A is an external front view of this interrogator 1, FIG. 4B is a sectional view thereof taken along line A–A' shown in FIG. 4A, and FIG. 4C is a sectional view thereof taken along line B–B' shown in FIG. 4A. The internal circuits 10 other than the antenna 14 are enclosed in a shielding member 300 made of a material that shuts off, reflects, or absorbs radio waves.

The shielding member 300 enclosing the internal circuits 10 has a recess I formed therein so as to sink inward. The antenna 14 is arranged in this recess I. In front of the antenna 14, a shielding member 400 made of a material that shuts off, reflects, or absorbs radio waves is arranged so as to cover the opening of the recess I. The shielding member 400 has four quadrilateral openings W formed in a grid-like formation in the portion thereof facing part of the front face of the antenna 14. Thus, when the interrogator 1 is viewed from its front face, part of the front face of the antenna 14 can be seen through the four openings W. In this way, the shielding member enclosing the antenna 14 has openings formed in the portion thereof facing part of the front face of the antenna 14. The shielding members 300 and 400 may be formed integrally out of, for example, the same metal.

Figure 5:
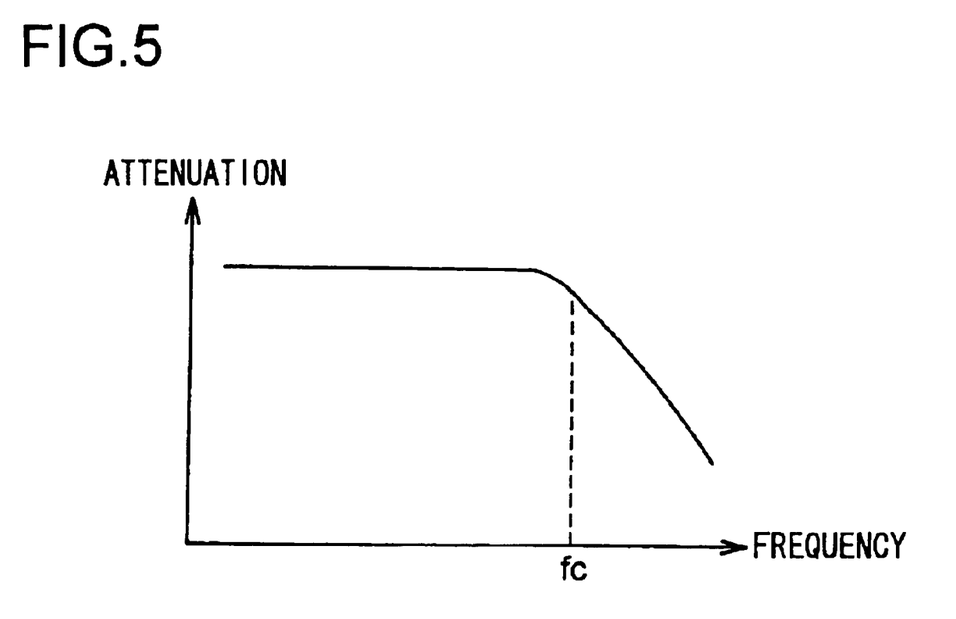
FIG. 5 is a diagram showing the frequency response of the radio waves emitted from the antenna of the interrogator to outside the interrogator in the second embodiment of the invention.

In this structure, the attenuation of the radio waves emitted from the antenna 14 to outside the interrogator and their frequency have a relationship as shown in FIG. 5. That is, radio waves are attenuated in a frequency band below and including a cut-off frequency "$f_c$". This cut-off frequency "$f_c$" correlates with the openings W of the shielding member 400 (specifically, the larger the area of the part of the antenna 14 that can be seen through the openings W, the lower the cut-off frequency "$f_c$"). Therefore, by forming the openings W in the shielding member 400 appropriately so that the cut-off frequency "$f_c$" equals to the upper limit of the frequency band in which radio waves need to be attenuated, it is possible to alleviate unnecessary electromagnetic emission from the antenna 14.

Figure 6A:
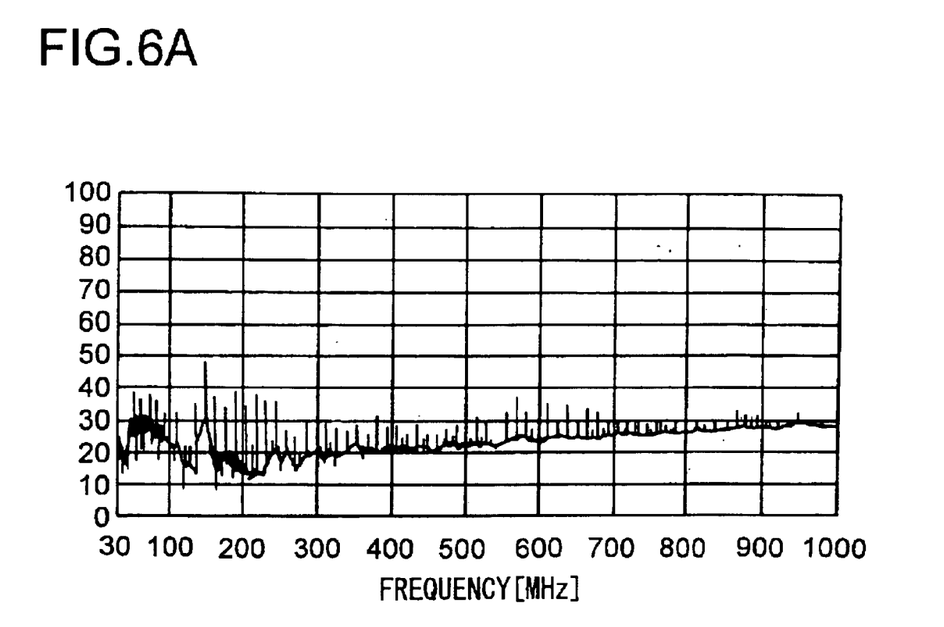
FIGS. 6A and 6B are diagrams showing the results of the measurement of unnecessary electromagnetic emission from a conventional interrogator and from the interrogator of the second embodiment of the invention, respectively.
Figure 6B:
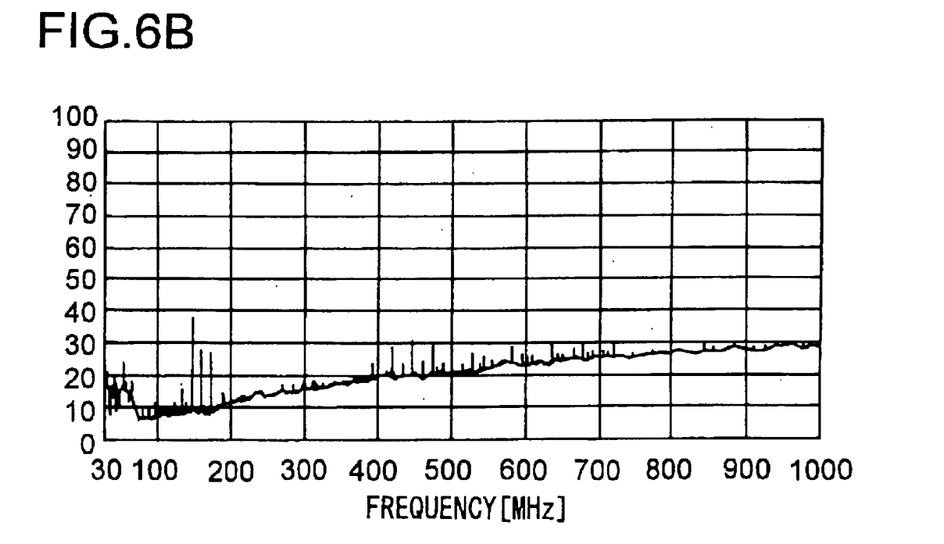

FIG. 6A shows the results of the measurement of unnecessary electromagnetic emission (from 30 [MH] to 1 [GHz]) emitted from a conventional interrogator, and FIG. 6B shows the results of the same measurement conducted with the interrogator of the second embodiment. These figures show that unnecessary electromagnetic emission is greatly reduced with the interrogator of the second embodiment than with the conventional one.

In a non-contact communication system, the frequency used for communication is, for example, 13 [MHz]. Thus, in the structure of the second embodiment, which exhibits a frequency response as shown in FIG. 5, attempting to attenuate interfering radio waves defined as such in the relevant standards (from 30 [MHz] to 1 [GHz]) results in attenuating the radio waves used for communication as well. However, even then, magnetic coupling between the interrogator and the responder is secured, and therefore communication is unlikely to be affected in any way. This is because, as described earlier, in a non-contact communication system, communication is achieved by electromagnetic induction, and therefore communication is possible as long as magnetic coupling is secured between the interrogator and the responder.

As shown in FIG. 4B, by inserting a filter $F_2$ having a frequency response determined by the openings W of the shielding member 400 in the line L that electrically connects the antenna 14 to the internal circuits 10, it is possible to further alleviate unnecessary electromagnetic emission.

The openings formed in the shielding member 400 may have any other shape than a quadrilateral shape; for example, they may be circular in shape. There may be formed more or less than four such openings.

In the embodiments described above, the internal circuits may be enclosed doubly in a radio wave reflecting member made of, for example, metal and a radio wave absorbing member made of, for example, ferrite, with the radio wave reflecting member arranged outside and the radio wave absorbing member inside. This helps further alleviate unnecessary electromagnetic emission from the internal circuits.

INDUSTRIAL APPLICABILITY

As described above, according to the present invention, in a communication device that supplies electric power to a communication partner and communicates therewith by electromagnetic induction on a non-contact basis, it is possible to alleviate unnecessary electromagnetic emission from an antenna. This is useful in a non-contact communication system.

What is claimed is:

1. A communication device that supplies electric power to a communication partner and communicates therewith by electromagnetic induction on a non-contact basis, wherein electric circuits other than an antenna are enclosed in a first shielding member made of a material that shuts off, reflects, or absorbs radio waves, and the antenna is enclosed in a second shielding member of which a portion facing a front face of the antenna is made of a material that attenuates radio waves in a predetermined frequency band.

2. A communication device as claimed in claim 1, wherein the portion of the second shielding member facing the front face of the antenna has such a frequency response as to permit passage of radio waves only in a frequency band centered around a frequency used for communication.

3. A communication device as claimed in claim 1, wherein the first shielding member has a double structure by being composed of an inner layer made of a material that absorbs radio waves and an outer layer made of a material that reflects radio waves.

4. A communication device as claimed in claim 1, wherein a filter is inserted in a line that electrically connects the antenna to other electric circuits.

5. A communication device as claimed in claim 4, wherein the filter has a frequency response identical with a frequency response of the portion of the second shielding member facing the front face of the antenna.

6. A communication device as claimed in claim 1, wherein a portion of the first shielding member is shared as a portion of the second shielding member other than the portion thereof facing the front face of the antenna.

7. A communication device as claimed in claim 6, wherein the first shielding member has a recess formed therein so as to sink inward, the antenna is arranged in the recess, and the second shielding member is arranged so as to cover an opening of the recess.

8. A communication device that supplies electric power to a communication partner and communicates therewith by electromagnetic induction on a non-contact basis, wherein electric circuits other than an antenna are enclosed in a first shielding member made of a material that shuts off, reflects, or absorbs radio waves, and the antenna is enclosed in a second shielding member that has an opening formed in a portion thereof facing a front face of the antenna so as to attenuate radio waves in a frequency band corresponding to an area of the opening.

9. A communication device as claimed in claim 8, wherein the first shielding member has a double structure by being composed of an inner layer made of a material that absorbs radio waves and an outer layer made of a material that reflects radio waves.

10. A communication device as claimed in claim 8, wherein a filter is inserted in a line that electrically connects the antenna to other electric circuits.

11. A communication device as claimed in claim 10, wherein the filter has a frequency response identical with a frequency response of the portion of the second shielding member facing the front face of the antenna.

12. A communication device as claimed in claim 8, wherein a portion of the first shielding member is shared as a portion of the second shielding member other than the portion thereof facing the front face of the antenna.

13. A communication device as claimed in claim 12, wherein the first shielding member has a recess formed therein so as to sink inward, the antenna is arranged in the recess, and the second shielding member is arranged so as to cover an opening of the recess.

14. A communication device as claimed in claim 8, wherein the opening formed in the second shielding member is formed in such a way that the portion of the second shielding member facing the front face of the antenna has such a frequency response as to attenuate radio waves in a frequency band below and including an upper limit of frequencies that need to be attenuated.

15. A communication device as claimed in claim 14, wherein the second shielding member has four quadrilateral, openings formed therein in a grid-like arrangement.

* * * * *